Aug. 4, 1970  O. V. JONES, JR  3,522,871
STOCK FEEDING APPARATUS WITH SINGLE DRIVE ROLLER
Filed Aug. 30, 1968  3 Sheets-Sheet 1
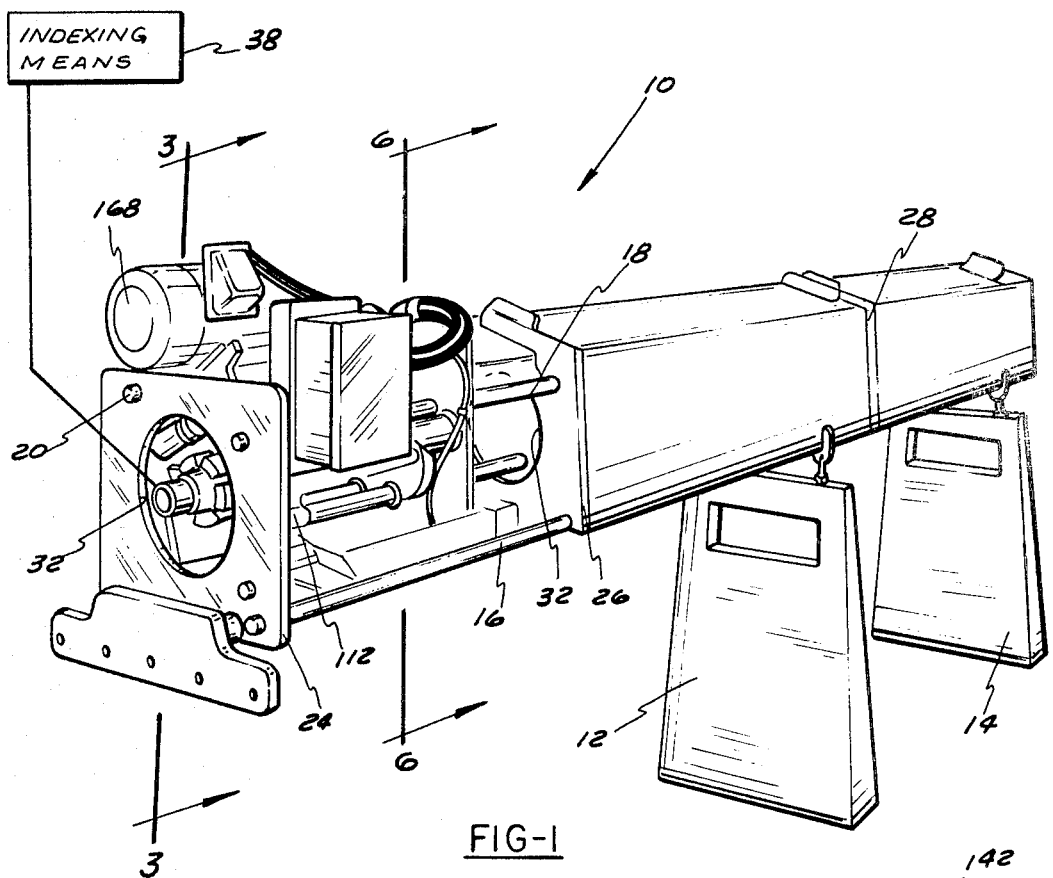
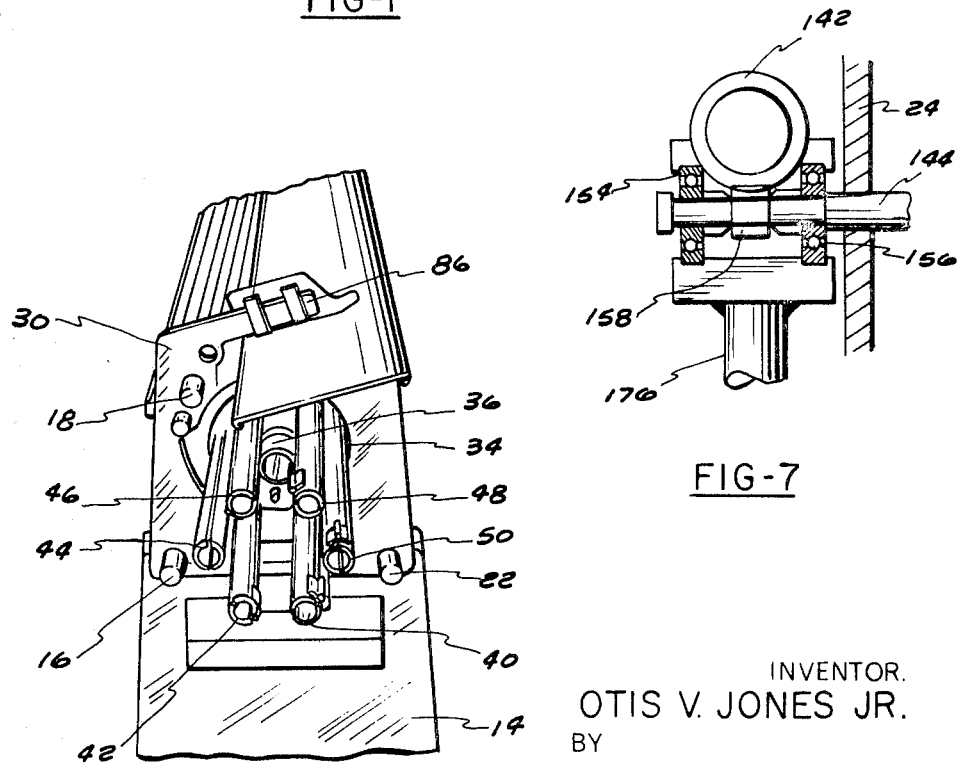
INVENTOR.
OTIS V. JONES JR.
BY
Hauke Krass Gifford & Patalidis
ATTORNEYS INVENTOR.
OTIS V. JONES JR.
BY
Hauke Knass Gifford & Patalidis
ATTORNEYS Aug. 4, 1970  O. V. JONES, JR  3,522,871
STOCK FEEDING APPARATUS WITH SINGLE DRIVE ROLLER
Filed Aug. 30, 1968  3 Sheets-Sheet 3
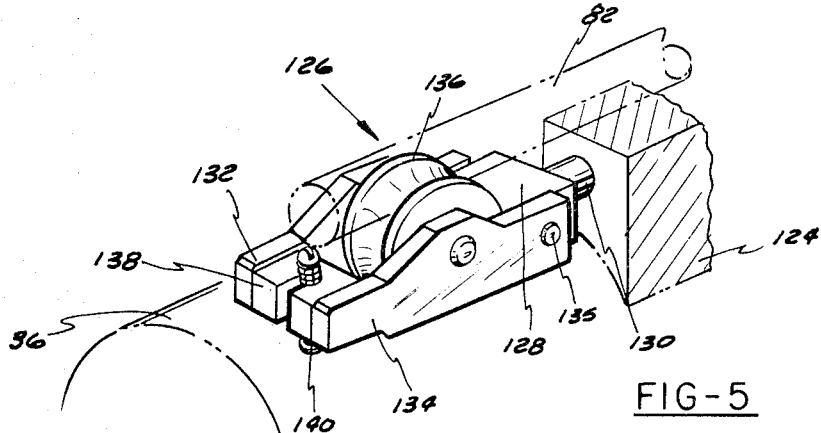
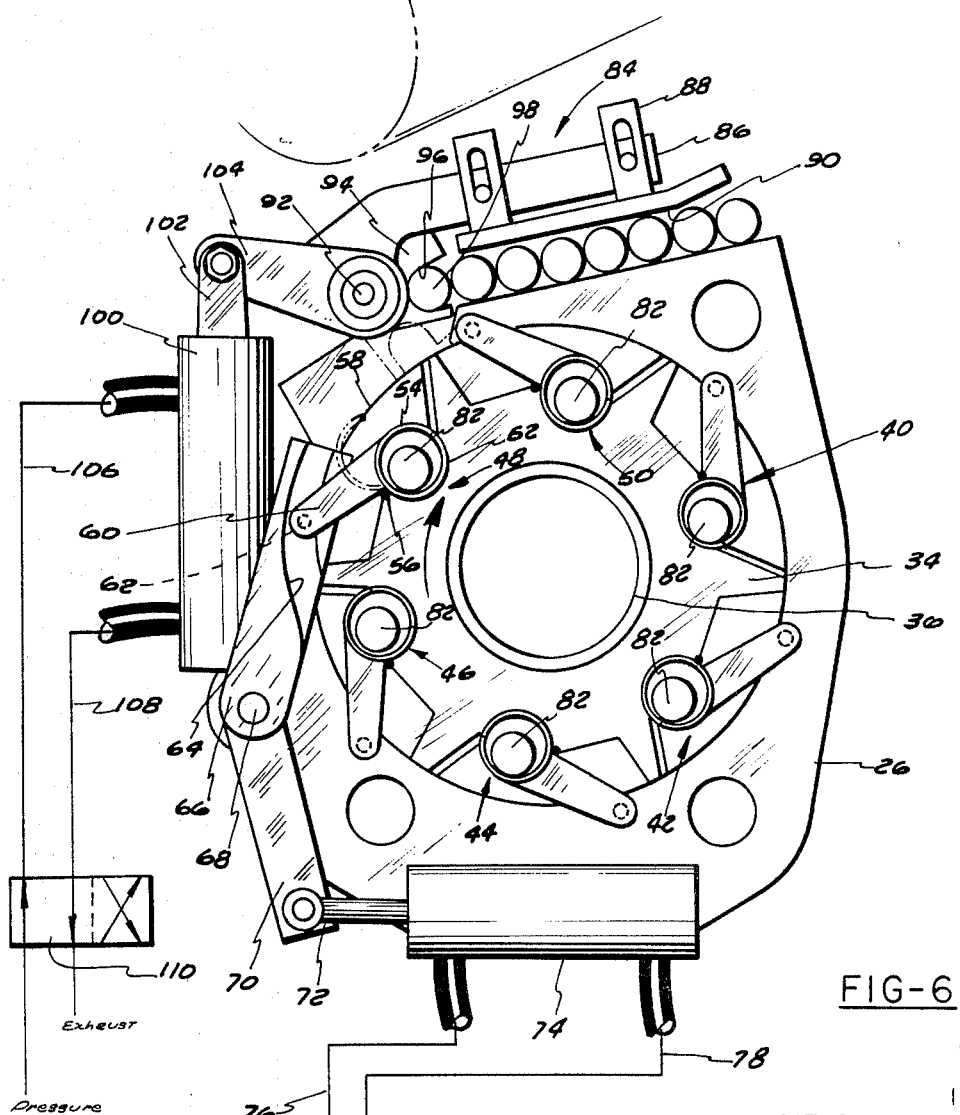
INVENTOR.
OTIS V. JONES JR.
BY
ATTORNEYS United States Patent Office 3,522,871
Patented Aug. 4, 1970

3,522,871
STOCK FEEDING APPARATUS WITH SINGLE
DRIVE ROLLER
Otis V. Jones, Jr., Dearborn, Mich., assignor to Acro
Feed Industries, Inc., Detroit, Mich., a corporation of
Michigan
Filed Aug. 30, 1968, Ser. No. 756,621
Int. Cl. B65g 47/00
U.S. Cl. 198—25    8 Claims

ABSTRACT OF THE DISCLOSURE

A stock feed apparatus for supplying bar stock to a multiple spindle screw machine. A plurality of stock sections are supported in a reel parallel to one another in a circular array, each being successively indexed into a feed position. An idler roller is engaged with each supported stock section and advances with the stock into the feed position where a single drive roller cooperates with the idler roller to advance the stock in the direction of its length toward the collet of the spindle machine.

BACKGROUND OF THE INVENTION

This invention relates to a device for automatically feeding bar stock to a machine employing a plurality of work spindles.

Metal working machines such as multi-spindle automatics which form a plurality of identical parts from bar stock operate at such high rates that automatic feed apparatus must be employed to replenish the stock as it is consumed. Such devices usually employ a magazine loaded with a number of bars which are loaded into a reel, where a suitable feed device advances the stock to each of the spindles as it is consumed.

Automatic feed apparatus of this type is illustrated in my Pat. No. 3,010,605 issued Nov. 28, 1961.

In such a feed system, the stock is supported in a rotatable reel which successively advances each section of unfinished stock into a feed position where a pair of co-operating rollers feed the stock in the direction of its length through the collet of the serviced machine where it is supported and then shaped by suitable cutting tools into a finished article. The cooperating rollers of the aforementioned patent are more fully described in my Pat. No. 2,811,884 issued Nov. 5, 1957.

In such a roller feed system, the two rollers are mounted for motion toward and away from the stock feed position so as to permit the stock to be indexed into the feed position. The rollers have gears which mesh when they are engaged with the stock so that a drive motor coupled with one of the rollers causes the two rollers to rotate in such a manner as to longitudinally feed the stock. After the stock has been advanced, the rollers are separated from the stock and both rollers removed from the feed position so as to permit the reel to rotate a new section of stock into the feed position.

The broad purpose of the present invention is to provide an improved roller feed means that allows an automatic multi-spindle feed appparatus to operate at higher output rates.

SUMMARY

In the preferred embodiment of the present invention, the stock is supported in a reel in a manner similar to that described in my aforementioned patent with one section being incrementally advanced through a supporting collet in the serviced machine in each indexed position of the reel. Each supported section of stock is engaged with an idler roller so that a six spindle machine has six sections of stock engaged with six idler rollers.

A single drive roller is pivotally mounted adjacent the feed position of the reel. The drive roller is moved away from the feed position of the reel when the stock is being indexed so as not to interfere with the motion of the stock. As each section of stock is indexed into the feed position, an actuator pivots the drive roller toward the stock so that it is compressed between its idler roller and the drive roller. The drive roller is then rotated to advance the stock in the direction of its length a predetermined increment.

This arrangement provides several advantages over roller means consisting of a pair of driven rollers which are both moved toward and away from the stock. For instance, only the drive roller is moved into and out of the feed position after the stock has been indexed. The drive roller needs to be moved radially toward and away from the circular path of rotation of the stock a distance less than half the radius of the stock. This materially reduces the time required to engage and disengage the stock thereby reducing the feed cycle.

Other advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a perspective view of a multiple spindle feed apparatus made in accordance with the present invention;

FIG. 2 is a perspective view showing the opposite end of the feed apparatus of FIG. 1, with some of the cover plates removed;

FIG. 5 is an enlarged view of an idler roller assembly;

FIG. 6 is a view as seen along lines 6—6 of FIG. 1 illustrating the means for loading stock into the feed reel; and FIG. 7 is a view as seen along lines 7—7 of FIG. 3 with parts in section for purposes of description.

DESCRIPTION OF THE PREFERRED EMBODIMENT

Figure 3:
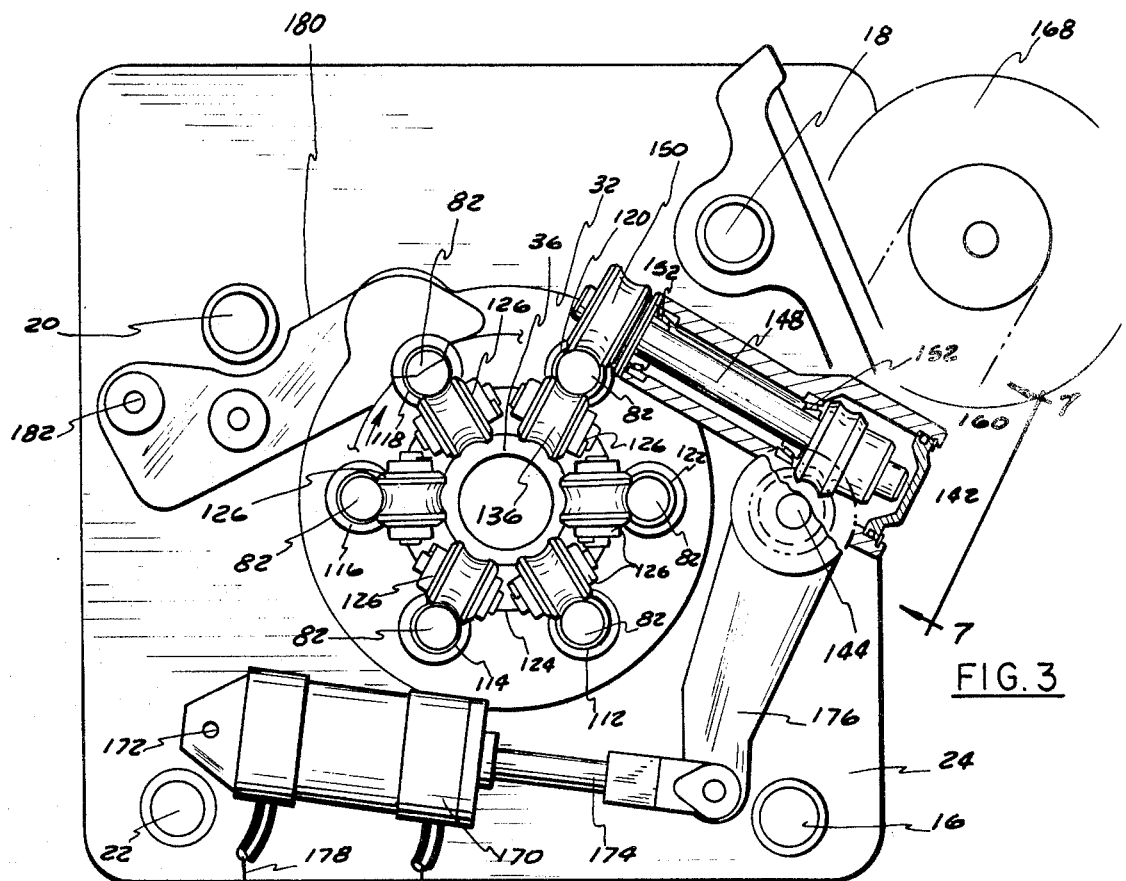
FIG. 3 is a view along lines 3—3 of FIG. 1, showing the roller feed means engaged with stock in the feed position.

Now referring to the drawings a preferred stock feeding apparatus, generally indicated at 10, is illustrated in FIG. 1 as comprising a pair of upright pedestals 12 and 14 arranged to support a series of horizontal support bars 16, 18, 20 and 22. The support bars 16, 18, 20 and 22, in turn, support a series of support plates 24, 26, 28 and 30. Each of the support plates has a circular opening 32, the openings 32 being aligned with one another. A circular plate 34 is rotatably mounted in each of the openings 32 of the support plates 26, 28 and 30. An elongated hollow tube 36 rigidly connects the plates 34 so that they can be rotated as a unit. Indexing means 38 are coupled to the tube 36 so as to rotate the plates 34 between six indexed positions in synchronization with the serviced screw machine. It is to be understood that a variety of methods can be employed for indexing the feed apparatus so that the stock rotates with the spindles of the serviced machine. For instance, the feed apparatus could be rotated with the serviced screw machine with the stock acting as a coupling between the screw machine and the feed apparatus.

Referring to FIG. 6, hinged tubes generally indicated at 40, 42, 44, 46, 48 and 50 are mounted on the support plates 26, 28 and 30 in parallel relationship to one another. Each tube consists of a pair of tube halves 52 and 54 with the tube half being welded to the support plates 26, 28 and 30 and the tube half 54 being connected to the tube half 52 by a hinge 56 for motion between open and closed positions. The tube 48 is illustrated in phantom in the open position. A flange 58, welded to each tube half 54, rests on the inner surface of the opening 32 of the support plate 26 so as to maintain the tube half 54 in its closed position relative to the tube half 52.

A pivoting arm 60 is welded to each tube half 54 adjacent the support plate 26. A cam follower 62, carried at the end of each lever 60, rides in a track 64 of a lever 66. The lever 66 is hingedly mounted by a pin 68 to the support plate 26. A link 70 has one end connected to pin 68 and its opposite end pivotally connected to the piston rod 72 of a linear actuator 74. Actuator 74 is mounted on the plate 26 with the rod 72 shown in its retracted position. The linear actuator 74 is connected by conduit means 76 and 78 to a valve 80 adapted to open and close communication with a source of air pressure and an exhaust means. When the piston rod 72 is extended, the link 70 pivots the link 66 in the clockwise direction so that the lever 60 pivots in a counterclockwise direction so as to open the tube half 54 to receive a section of bar stock 82 dropped from a loading means generally indicated at 84.

The stock 82 is initially loaded into each of the tubes 40, 42, 44, 46, 48 and 50 from the loading means 84 and thereafter as the stock is consumed. The loading means 84 comprises arms 86 attached to each of the support plates 26, 28 and 30. A bracket 88 is mounted on each of the arms to form a slot 90 in which a fresh supply of bar stock is periodically loaded.

A pivot rod 92 pivotally mounted on the support plates, supports an escapement lever 94 having a slot 96 engaged with the lowermost section of bar stock 98 disposed in the slot 90. A linear actuator 100, mounted on the support plate 26, has an extendable piston rod 102 connected by a lever 104 to the pivot rod 92. When the rod 102 is extended in response to a signal, it pivots the lever 104 in a clockwise direction so that the escapement lever 94 rotates to drop the lowermost stock 98 between the tubular halves 52 and 54 which are also opened in response to a signal.

The linear actuator 100 is connected to a source of pneumatic pressure and exhaust means through conduit means 106 and 108 and a valve 110. When the valve 110 is actuated it causes the linear actuator to extend and then retract the rod 102. This structure is essentially similar to the loading structure illustrated in my Pat. No. 3,010,605 and shows one means for loading fresh stock into the feed apparatus as the stock is consumed by the serviced machine.

The stock is normally dropped from the loading means 84 into the guide tubes and then advanced by pusher means (not shown toward the support plate 24. As the stock is advanced forwardly, it is received in a series of guide tubes 112, 144, 116, 118, 120 and 122 which terminate adjacent the support plate 24. The guide tubes rotate with the tubes 40 to 50 and guide each section of bar stock 82 toward an idler roller mounting plate 124. Plate 124 is fixedly mounted on the tubular member 36 adjacent the support plate 24. Six idler roller assemblies 126 are mounted on the plate 124 around the tubular member 36, one of the idler rollers being associated with each of the supported sections of stock 82.

Referring to FIG. 5, each idler roller assembly 126 comprises a block 128 fixedly mounted by a bolt 130 to the support plate 124. A pair of side supports 132 and 134 are connected by a bolt 135 to the block 128 and provide means for journaling an idler roller 136. The idler roller has a contour adapted to accommodate the size of the particular bar stock 82. A slotted block 138 is fixedly carried on the outer end of the side supports 132 and 134 and carries a threaded adjusting member 140. The lower end of the adjusting member 140 bears against the tubular member 36 and provides means for adjusting the position of the roller 136 toward and away from the supported position of the stock 82 to compensate for wear of the roller 136.

Now as best seen in FIG. 3, an elongated support housing 142 is pivotally mounted on a pivot shaft 144 carried on the frame member 24. A pair of spaced bearings 146 and 148 in the housing 142 support a spindle 148. A drive roller 150 is carried on the outer end of the spindle.

The housing 142 is mounted on the pivot shaft 144 by a pair of spaced bearing means 154 and 156 so that the housing can be held stationary while the pivot shaft 144 rotates. The pivot shaft 144 is drivably coupled to the spindle 48 by a pair of cooperating gear means 158 and 160. A sprocket 162 carried on the pivot shaft 144 is coupled to a drive sprocket 164 by a chain 166. The drive sprocket 164 is mounted on the output shaft of drive motor 168. Thus the drive roller 150 is rotated about its axis by the drive motor 168.

Figure 4:
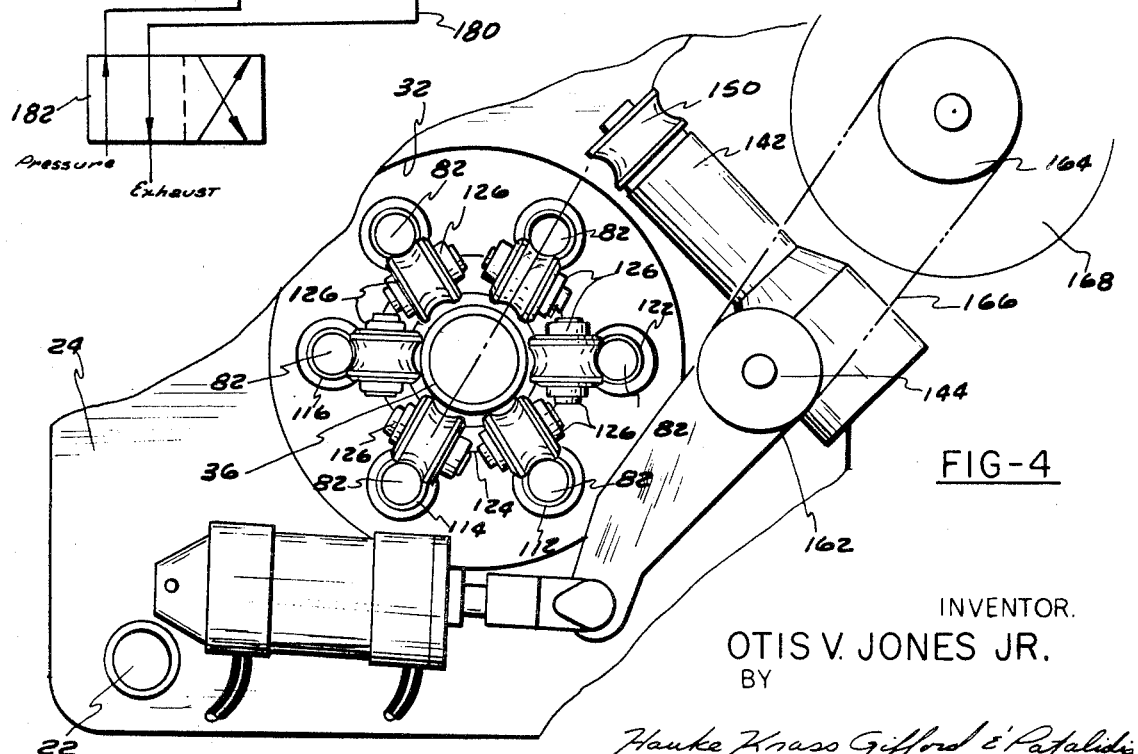
FIG. 4 is a view similar to FIG. 3 but showing the drive roller separated from the stock so as to permit the reel to index the stock.

Referring to FIGS. 3 and 4, the roller 150 is movable toward and away from one of the indexed positions of the stock 82 which is the "stock feed" position. A linear actuator 170 mounted on the support plate 24 by a pivot pin 172 has an extendable rod 174 pivotally connected to an actuating lever 176 which, in turn, is fixedly connected to the housing 142. The linear actuator 170 is powered through conduit means 178 and 180 which are connected by valve means 182 to a source of pneumatic pressure and a suitable exhaust.

When the rod 174 is extended, as illustrated in FIG. 3, the drive roller 150 pivots in the counterclockwise direction toward the feed position of the stock 82. When the rod 174 is retracted by the linear actuator, the drive roller 150 is pivoted away from the stock 82 in the feed position. Normally the pivotal motion of the roller 150 is just sufficient to allow the stock to be indexed to a succeeding position. Thus it can be seen that the necessary pivotal travel of the roller need be only a fraction of the radius of the stock 82.

In operation, the supported stock 82 is successively indexed into the feed position. As the stock is indexed between positions, the drive roller 150 is radially spaced from the circular path of the stock feed so as not to interfere with the motion of the stock. Each section of the stock 82 is engaged with one of the idler rollers 126. After each indexing operation, the stock in the feed position is engaged on opposite sides by its associated idler roller 126 and by the drive roller which is pivoted by the linear actuator 170. The motor 168 then rotates the drive roller 150 so as to advance the stock in the direction of its length into the screw machine (not shown) where it is received and supported by a collet. The drive roller 150 is then pivoted away from the feed position so that the next section of stock can be indexed into the feed position.

Cutting tools on the screw machine shape the supported section of bar stock and the finished stock is then cut off. As the stock 82 is consumed, a sensing apparatus 180 pivotally mounted by a pin 182 to the support plate 24 senses the absence of stock and provides a signal through a suitable control circuit (not shown) so as to actuate the loading means 84. Thus the stock is continually being replenished as it is consumed.

It can be seen that the improved drive roller arrangement permits a much faster indexing of the feed apparatus because the idler roller never moves relative to the supported position of its associated stock and the drive roller has to be pivoted in a very limited travel. It is to be understood that although the feed apparatus is illustrated for supporting six sections of bar stock, the invention is applicable to a reel which supplies bar stock to a machine having any number of spindles.

Although I have described but one embodiment of my invention, it is to be understood that various changes and

What is claimed is:
1. Bar stock feeding apparatus, including:
   (a) frame means;
   (b) a plurality of bar stock support means movable on said frame means between a plurality of positions including a feed position;
   (c) a plurality of idler rollers on said support means, one idler roller being associated with each of said bar stock support means and being disposed in a feed position when its asociated bar stock support means is in its feed position;
   (d) a drive roller movably mounted on said frame means adjacent the feed position of said bar stock support means;
   (e) means for moving said drive roller toward the idler roller in the feed position so as to engage stock supported between it and the idler roller which is in the feed position; and
   (f) means for rotating the drive roller when engaged with the supported stock so that it cooperates with the idler roller in the feed position so as to move the stock between them.

2. The stock feeding apparatus as defined in claim 1, wherein each of said bar stock support means is adapted to support a section of bar stock adjacent each of said idler rollers in each of the positions of said support means so that of said idler rollers and a section of supported stock are in the feed position in each of the positions of said support means.

3. The stock feeding apparatus as defined in claim 1, wherein said bar stock support means are rotatable about an axis, each of sid support mens being adapted to support a section of stock parallel to said axis and adjacent an idler roller; and including means for rotating said support means so that said drive roller consecutively cooperates with each of said idler rollers to move supported stock.

4. The stock feeding apparatus as defined in claim 1, wherein said drive roller moving means is adapted to move said drive roller away from the idler roller in the feed position so as to permit the idler roller in the feed position and its associated stock support means to be moved to a non-feed position and another idler roller and its associated stock support means to be moved from a non-feed position to the feed position.

5. The stock feeding apparatus as defined in claim 1, wherein said bar stock support means are rotatably mounted on said frame means and the idler rollers mounted on said support means so that one of the idler rollers and its associated bar stock support means occupies the feed position in each of the positions of said support means.

6. The stock feeding apparatus as defined in claim 1, wherein the drive roller is pivotally mounted on said frame means for motion toward and away from the feed position of said bar stock suport means between a first position wherein it cooperates with the idler roller in the feed position to move supported stock between them, and a second position where it allows moved stock with its associated idler roller to be advanced from the feed position to a non-feed position.

7. The stock feeding apparatus as defined in claim 1, including guide means for supporting a section of stock in continuous engagement with each of said idler rollers as said support means is rotated between each of its indexed positions; and means for loading a new section of stock into said guide means as the stock is consumed.

8. Bar stock feeding apparatus, including: a frame; support means rotatably mounted on said frame and adapted to support a plurality of bar stock sections parallel to one another and to the axis of rotation of said support means; means for indexing said support means so that the stock is advanced through a series of consecutive positions including a feed position; an idler roller mounted on said support means adjacent each of the supported positions of the stock so as to be engaged with the stock; a drive roller; means for pivotally mounting said drive roller for motion toward and away from the idler roller in the feed position; means for pivoting the drive roller toward the idler roller in the feed position so as to engage stock between them; means for rotating said drive roller when engaged with stock so as to advance the stock in the direction of its length; and means for pivoting the drive roller away from the idler roller in the feed position to permit the stock in the feed position to be rotated to a non-feed position.

References Cited

UNITED STATES PATENTS 3,010,605   11/1961   Jones _____ 221—81

RICHARD E. AEGERTER, Primary Examiner

U.S. Cl. X.R.

198—105